United States Patent
Kim et al.

(10) Patent No.: US 11,082,829 B2
(45) Date of Patent: Aug. 3, 2021

(54) METHOD FOR TRANSMITTING AND RECEIVING SIGNAL RELATED TO SWITCHING ACCESS IN WIRELESS COMMUNICATION SYSTEM, AND DEVICE THEREFOR

(71) Applicant: LG ELECTRONICS INC., Seoul (KR)

(72) Inventors: Laeyoung Kim, Seoul (KR); Jaehyun Kim, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/761,445

(22) PCT Filed: Nov. 13, 2018

(86) PCT No.: PCT/KR2018/013800
§ 371 (c)(1),
(2) Date: May 4, 2020

(87) PCT Pub. No.: WO2019/093857
PCT Pub. Date: May 16, 2019

(65) Prior Publication Data
US 2020/0396587 A1    Dec. 17, 2020

Related U.S. Application Data

(60) Provisional application No. 62/588,935, filed on Nov. 21, 2017, provisional application No. 62/585,491, filed on Nov. 13, 2017.

(30) Foreign Application Priority Data

Nov. 13, 2018  (KR) .................. 10-2018-0138911

(51) Int. Cl.
*H04W 8/12* (2009.01)
*H04W 8/04* (2009.01)

(52) U.S. Cl.
CPC ............... *H04W 8/12* (2013.01); *H04W 8/04* (2013.01)

(58) Field of Classification Search
CPC .................................. H04W 8/04; H04W 8/12
(Continued)

(56) References Cited

U.S. PATENT DOCUMENTS

| | | | | |
|---|---|---|---|---|
| 2012/0307732 A1* | 12/2012 | Olsson | ................. | H04W 64/00 370/328 |
| 2018/0199279 A1* | 7/2018 | Baek | ..................... | H04W 48/18 |
| 2020/0120585 A1* | 4/2020 | Kumar | ................. | H04W 76/25 |

FOREIGN PATENT DOCUMENTS

| CN | 110049484 | 7/2019 |
|---|---|---|
| KR | 101248954 | 4/2013 |

(Continued)

OTHER PUBLICATIONS

3GPP TS 23.501 V1.4.0 (Year: 2017).*
(Continued)

*Primary Examiner* — William Nealon
(74) *Attorney, Agent, or Firm* — Fish & Richardson P.C.

(57) ABSTRACT

A method for transmitting and receiving a signal related to switching 3rd generation partnership project (3GPP) access to a 5th generation system (5GS) in an evolved packet system (EPS) in a wireless communication system includes: a step in which a second access and mobility management function (AMF) receives a message, related to a registration request and including a first 5G globally unique temporary identifier (5G-GUTI), from a UE that receives non-3GPP access service through the 5GS and 3GPP access service through the EPS; and a step in which the second AMF
(Continued)

transmits to the UE, a message related to a registration acceptance and including a second 5G-GUTI. The first 5G-GUTI includes ID information on the first AMF which serves the non-3GPP access of the UE, and the second 5G-GUTI includes ID information on the second AMF which serves both the non-3GPP access and the 3GPP access of the UE.

10 Claims, 18 Drawing Sheets

(58) Field of Classification Search
USPC ...................................................... 455/435.2
See application file for complete search history.

(56) References Cited

FOREIGN PATENT DOCUMENTS

| KR | 1020140073870 | 6/2014 |
|----|---------------|--------|
| KR | 101429167     | 8/2014 |
| WO | WO20036883    | 2/2020 |

OTHER PUBLICATIONS

3GPP TS 502 V1.2.0 (Year: 2017).*
3GPP WG2 Meeting #123 S2-177794 (Year: 2017).*
3rd Generation Partnership Project; Technical Specification Group Services and System Aspects, "Procedures for the 5G System; Stage 2 (Release 15)," 3GPP TS 23.502, V1.2.0, dated Sep. 2017, 165 pages.
3rd Generation Partnership Project; Technical Specification Group Services and System Aspects, "Security Architecture and Procedures for 5G System (Release 15)," 3GPP TS 33.501, V0.4.0, dated Oct. 2017, 70 pages.
3rd Generation Partnership Project; Technical Specification Group Services and System Aspects, "System Architecture for the 5G System; Stage 2 (Release 15)," 3GPP TS 23.501, V1.2.0, dated Jul. 2017, 166 pages.
KR Notice of Allowance in Korean Appln. No. 10-2018-0138911, dated Nov. 18, 2020, 4 pages (with English translation).
KR Office Action in Korean Appln. No. 10-2018-0138911, dated Jan. 22, 2020, 11 pages (with English translation).
KR Office Action in Korean Appln. No. 10-2018-0138911, dated Mar. 18, 2019, 10 pages (with English translation).
PCT International Search Report in International Appln. No. PCT/KR2018/013800, dated Feb. 19, 2019, 7 pages (with English translation).
EP Extended European Search Report in European Appln. No. 18876697.6, dated Jun. 1, 2021, 15 pages.
Intel, "On interworking between non-3GPP access/ 5GC and EPC," S2-177044, SA WG2 Meeting #123, Ljubljana, Slovenia, dated Oct. 23-27, 2017, 3 pages.
Qualcomm Incorporated, "TS 23.501: Essential Corrections to Registration and Connection Management," S2-177853, SA WG2 Meeting #S2-123, Ljubljana, Slovenia, dated Oct. 23-27, 2017, 13 pages.
ZTE, "TS 23.502 Update on Registration procedure," S2-176075, SA WG2 Meeting #122bis, Sophia Antipolis, France, dated Aug. 21-25, 2017, 8 pages.

\* cited by examiner

METHOD FOR TRANSMITTING AND RECEIVING SIGNAL RELATED TO SWITCHING ACCESS IN WIRELESS COMMUNICATION SYSTEM, AND DEVICE THEREFOR

CROSS-REFERENCE TO RELATED APPLICATIONS

This application is a National Stage application under 35 U.S.C. § 371 of International Application No. PCT/KR2018/013800, filed on Nov. 13, 2018, which claims the benefit of Korean Application No. 10-2018-0138911, filed on Nov. 13, 2018, U.S. Provisional Application No. 62/588,935, filed on Nov. 21, 2017, and U.S. Provisional Application No. 62/585,491, filed on Nov. 13, 2017. The disclosures of the prior applications are incorporated by reference in their entirety.

TECHNICAL FIELD

The following description relates to a wireless communication system, and more particularly, to a method and apparatus for efficiently providing interworking between a 3 GPP 5G system and an EPS.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

DISCLOSURE

Technical Task

The technical task of the present disclosure is to provide a method for transceiving signals related to a switching of 3rd Generation Partnership Project (3GPP) access to a 5th Generation System (5GS) in Evolved Packet System (EPS).

Technical tasks obtainable from the present disclosure are non-limited by the above-mentioned technical task. And, other unmentioned technical tasks can be clearly understood from the following description by those having ordinary skill in the technical field to which the present disclosure pertains.

Technical Solutions

In one technical aspect of the present disclosure, provided herein is a method of transceiving signals related to switching of $3^{rd}$ Generation Partnership Project (3GPP) to $5^{th}$ Generation System (5GS) from Evolved Packet System (EPS) in a wireless communication system, the method including receiving a message related to a registration request including a first 5G-Globally Unique Temporary Identifier (5G-GUTI) by a second Access and Mobility Management Function (AMF) from a User Equipment (UE) receiving a service of non-3GPP access through the 5GS and a service of 3GPP access through the EPS and sending a message related to a registration acceptance including a second 5G-GUTI by the second AMF to the UE, wherein the first 5G-GUTI includes ID information of the first AMF serving the non-3GPP access of the UE and wherein the second 5G-GUTI includes ID information of the second AMF serving both of the non-3GPP access and the 3GPP access of the UE.

In another technical aspect of the present disclosure, provided herein is an apparatus for a registration procedure related to switching of $3^{rd}$ Generation Partnership Project (3GPP) to $5^{th}$ Generation System (5GS) from Evolved Packet System (EPS) in a wireless communication system, the apparatus including a memory and at least one processor coupled to the memory, wherein the at least one processor configured to enable a second AMF to receive a message related to a registration request including a first 5G-GUTI from a UE receiving a service of non-3GPP access through a 5GS and a service of 3GPP access through an EPS and send a message related to a registration acceptance including a second 5G-GUTI to the UE, wherein the first 5G-GUTI includes ID information of the first AMF serving the non-3GPP access of the UE, and wherein the second 5G-GUTI includes ID information of the second AMF serving both of the non-3GPP access and the 3GPP access of the UE.

The second AMF may make a request for a transfer of context of the UE to the first AMF and receive the context of the UE from the first AMF.

The second AMF may register with Unified Data Management (UDM) that it is a serving AMF for the non-3GPP access and the 3GPP access of the UE.

If the first AMF is different from the second AMF, the first AMF may be released from a serving AMF of the UE.

The message related to the registration acceptance may include information indicating that the second AMF serves the non-3GPP access of the UE.

Advantageous Effects

According to the present disclosure, it is able to eliminate inefficiency generated when an AMF different for each of a non-3GPP access and a 3GPP access serves a UE in 5G.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the disclosure.

BEST MODE FOR DISCLOSURE

Figure 1:
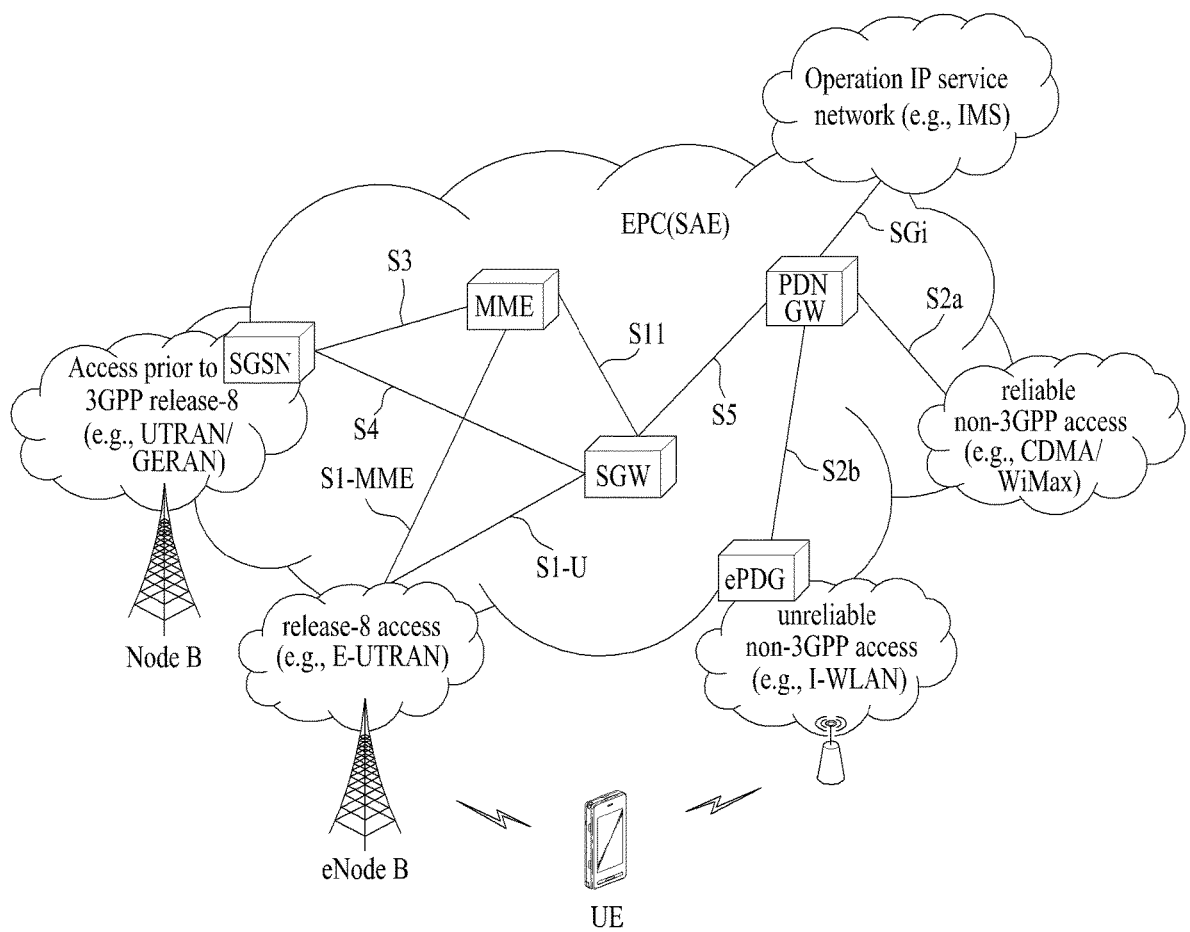
FIG. 1 is a schematic diagram illustrating the structure of an evolved packet system (EPS) including an evolved packet core (EPC).

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data is exchanged through a direct data path without passing through a 3GPP core network (e.g., EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
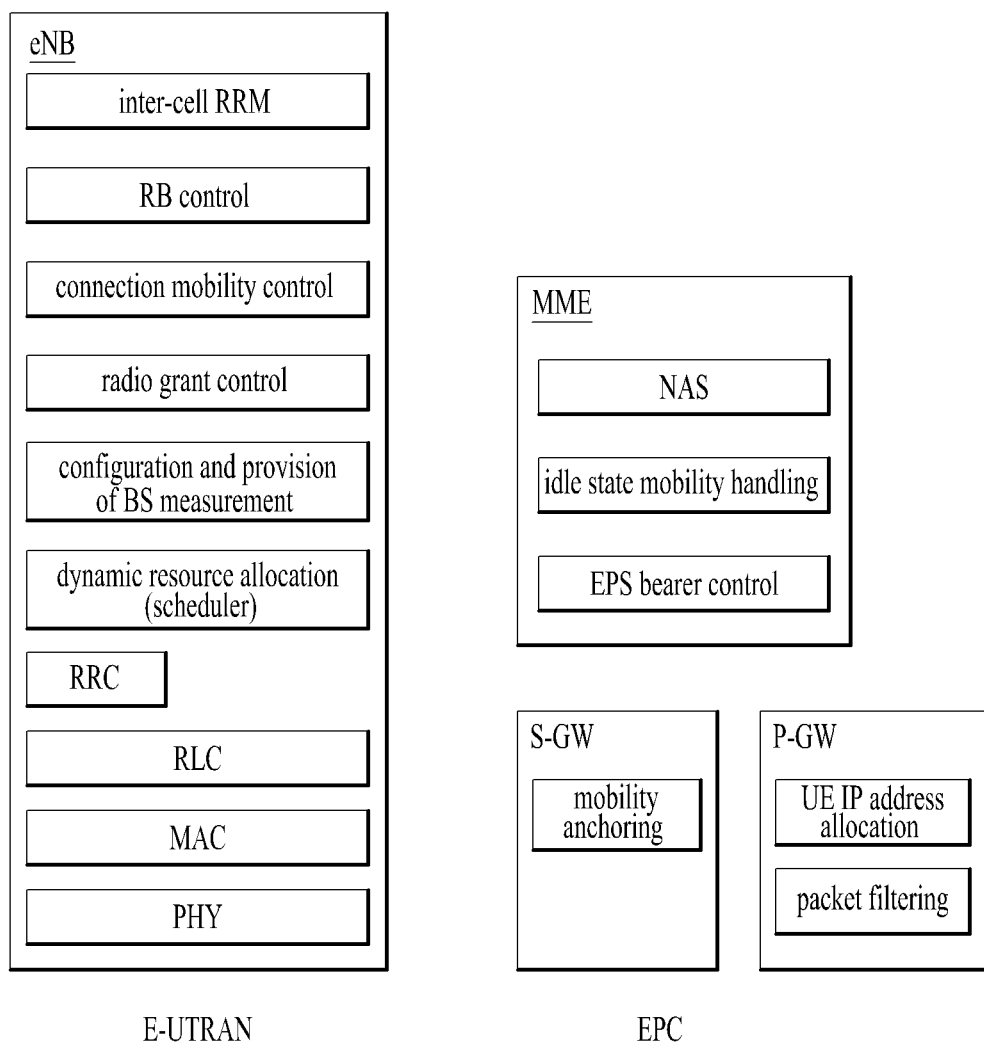
FIG. 2 is a diagram illustrating the general architectures of an E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
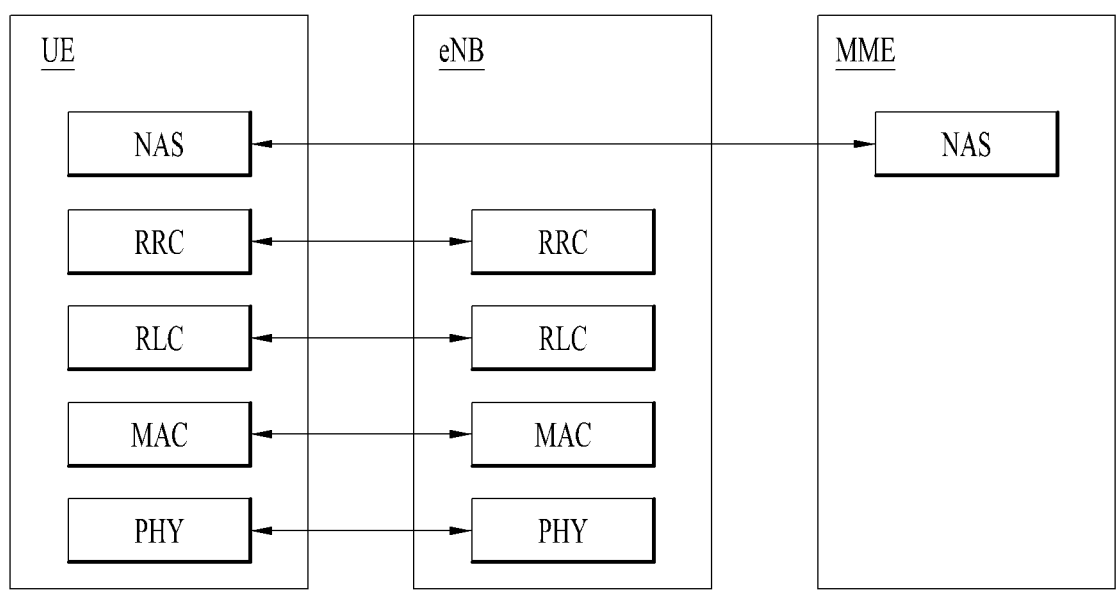
FIG. 3 is a diagram illustrating the structure of a radio interface protocol in a control plane.
Figure 4:
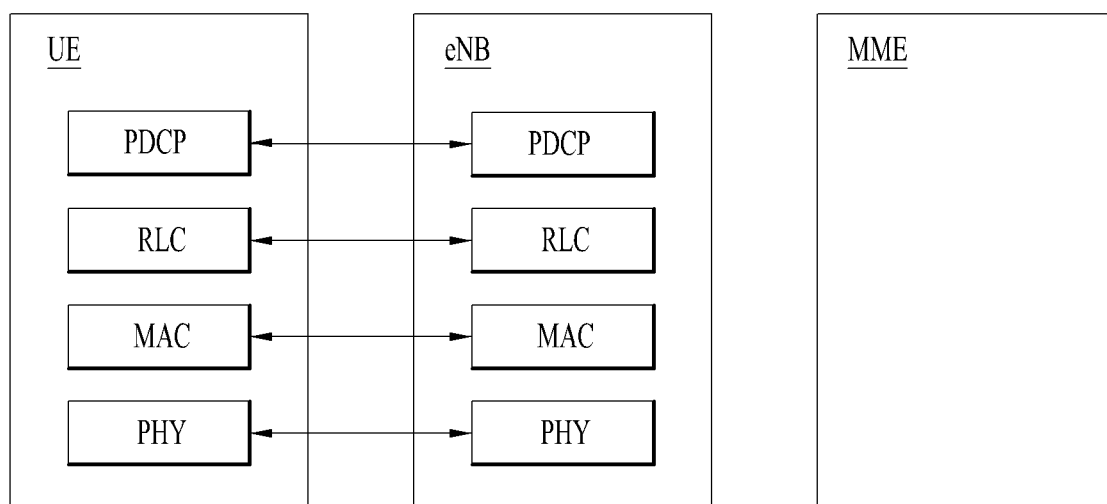
FIG. 4 is a diagram illustrating the structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. A default bearer resource is characterized in being allocated from a network when a specific packet data network (PDN) is initially accessed. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. In case of the default bearer, a non-GBR bearer is allocated. In case of the dedicated bearer, a bearer having QoS characteristics of GBR or non-GBR may be allocated.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
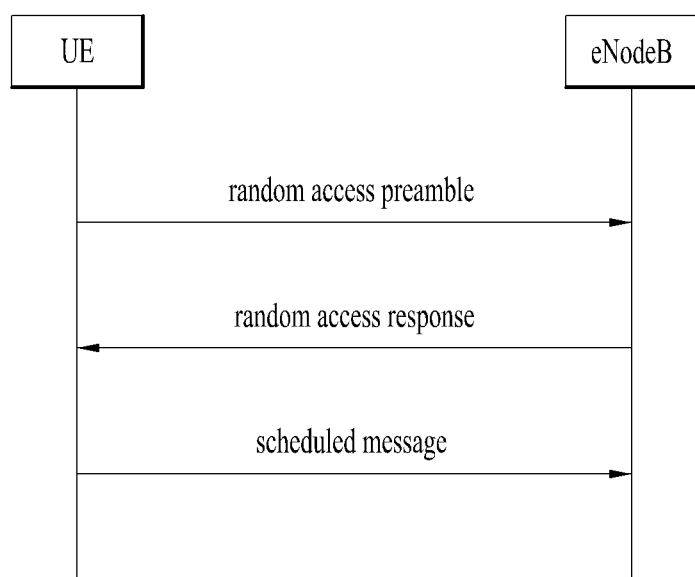
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
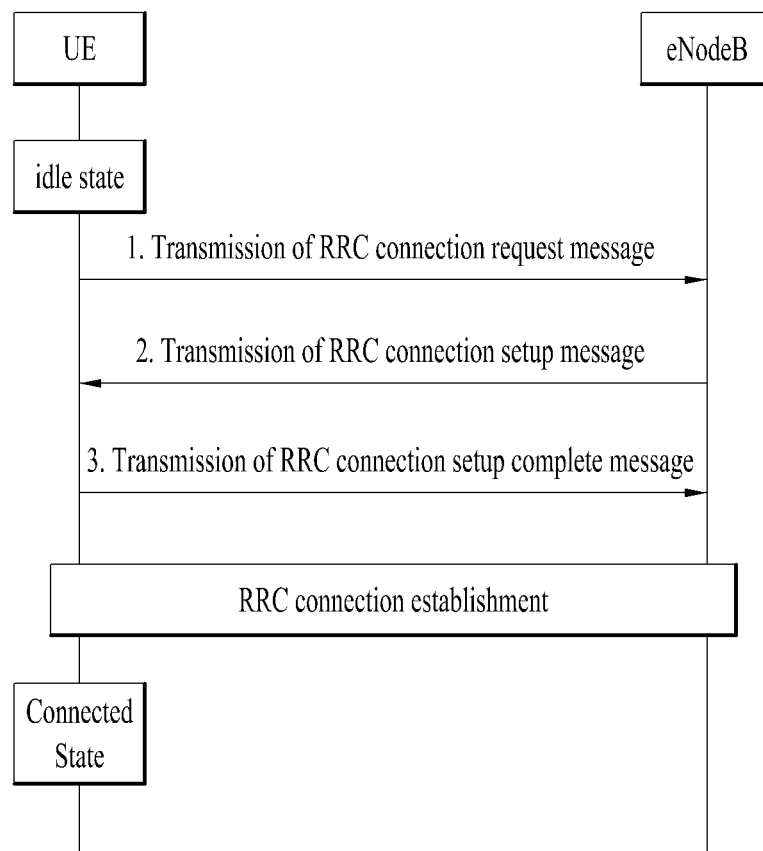
FIG. 6 is a diagram illustrating a connection process in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
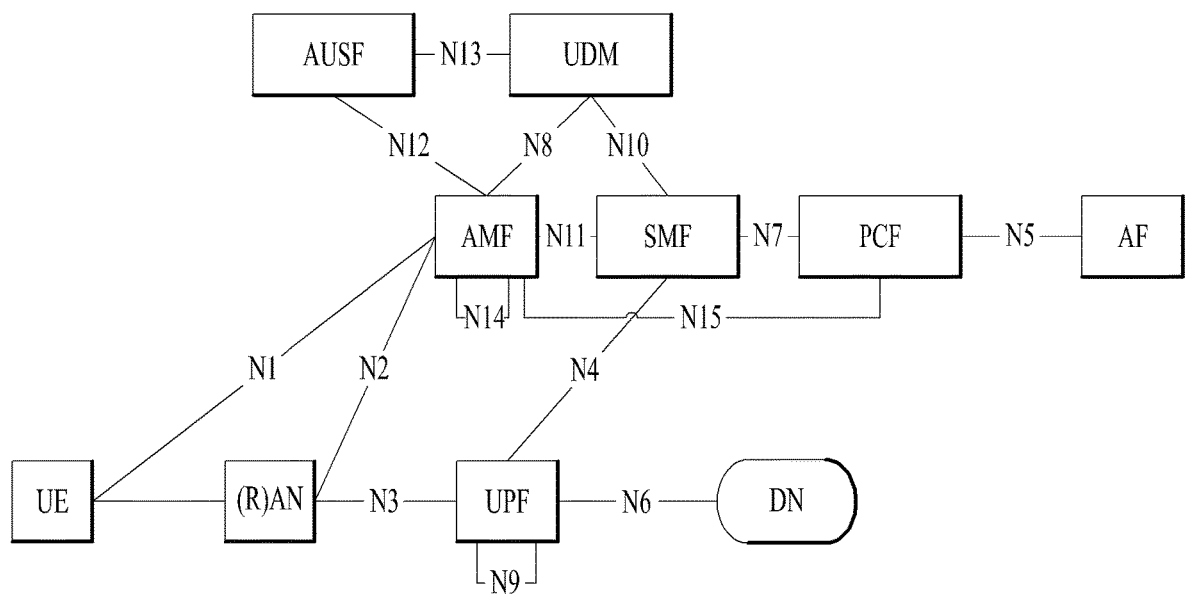
FIG. 7 is a diagram illustrating a 5$^{th}$ generation (5G) system.

An MME in a conventional EPC is divided into a Core Access and Mobility Management Function (AMF) and a Session Management Function (SMF) in a next generation system (or 5G Core Network (CN)). Hence, NAS interaction and Mobility Management (MM) with a UE are performed by the AMF and Session Management (SM) is performed by the SMF. The SMF also manages a User Plane Function (UPF) that is a gateway for routing user traffic. This may be regarded as the SMF is responsible for a control-plane part of an S-GW and a P-GW in the conventional EPC and as the UPF is responsible for a user-plane part. For the routing of the user traffic, one or more UPFs may exist between an RAN and a Data Network (DN). Namely, the conventional EPC may be configured as exemplarily shown in FIG. 7. In addition, as a concept corresponding to PDN connection in the conventional EPS, a Protocol Data Unit (PDU) session is defined in the 5G system. The PDU session is referred to as association between a UE and a DN, which provides a PDU connectivity service of an Ethernet or unstructured type as well as an IP type. Besides, a Unified Data Management (UDM) performs a function corresponding to an HSS of the EPC and a Policy Control Function (PCF) performs a function corresponding to a PCRF of the EPC. Of course, such functions may be provided in an extended form to meet the requirements of the 5G system. Details of 5G system architecture, each function and each interface refer to TS 23.501.

The 5G system is tasked in TS 23.501, TS 23.502 and TS 23.503. Therefore, the preset disclosure will refer to the above specifications for the 5G system. NG-RAN related architecture and details will refer to TS 38.300, etc. The 5G system supports non-3GPP access, and thus details such as architecture for supporting the non-3GPP access, network elements and the like are described in clause 4.2.8 of TS 23.501. And, procedures for supporting the non-3GPP access are described in clause 4.12 of TS 23.502. A main example of non-3GPP access may include WLAN access that may include a trusted WLAN and an untrusted WLAN both. Access and Mobility Management Function (AMF) of 5G system performs Registration Management (RM) and Connection Management (CM) for non-3GPP access as well as for 3GPP access.

Figure 8:
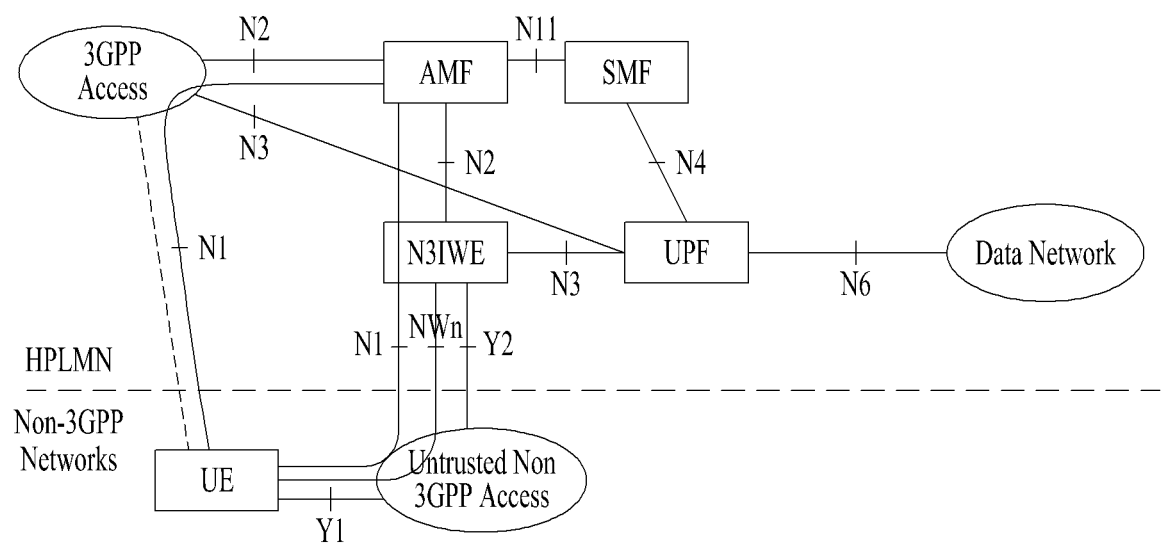
FIG. 8 shows a non-roaming architecture supportive of a non-3GPP access.

FIG. 8 shows a non-roaming architecture supportive of a non-3GPP access. As shown in FIG. 8, the same AMF serves a UE for 3GPP access and non-3GPP access pertaining to the same PLMN, whereby a single network function can collectively and efficiently support authentication, mobility management, session management and the like for a UE registered through two difference accesses.

Moreover, the 5G system (i.e., next generation system) should provide interworking with EPS that is a legacy system. Regarding the interworking with EPS, clause 4.3 (Interworking with E-UTRAN connected to EPC) and clause 5.17.2 (Interworking with EPC) of TS 23.501 and clause 4.11 (System interworking procedures with EPS) of TS 23.502 will be referred to.

Figure 9:
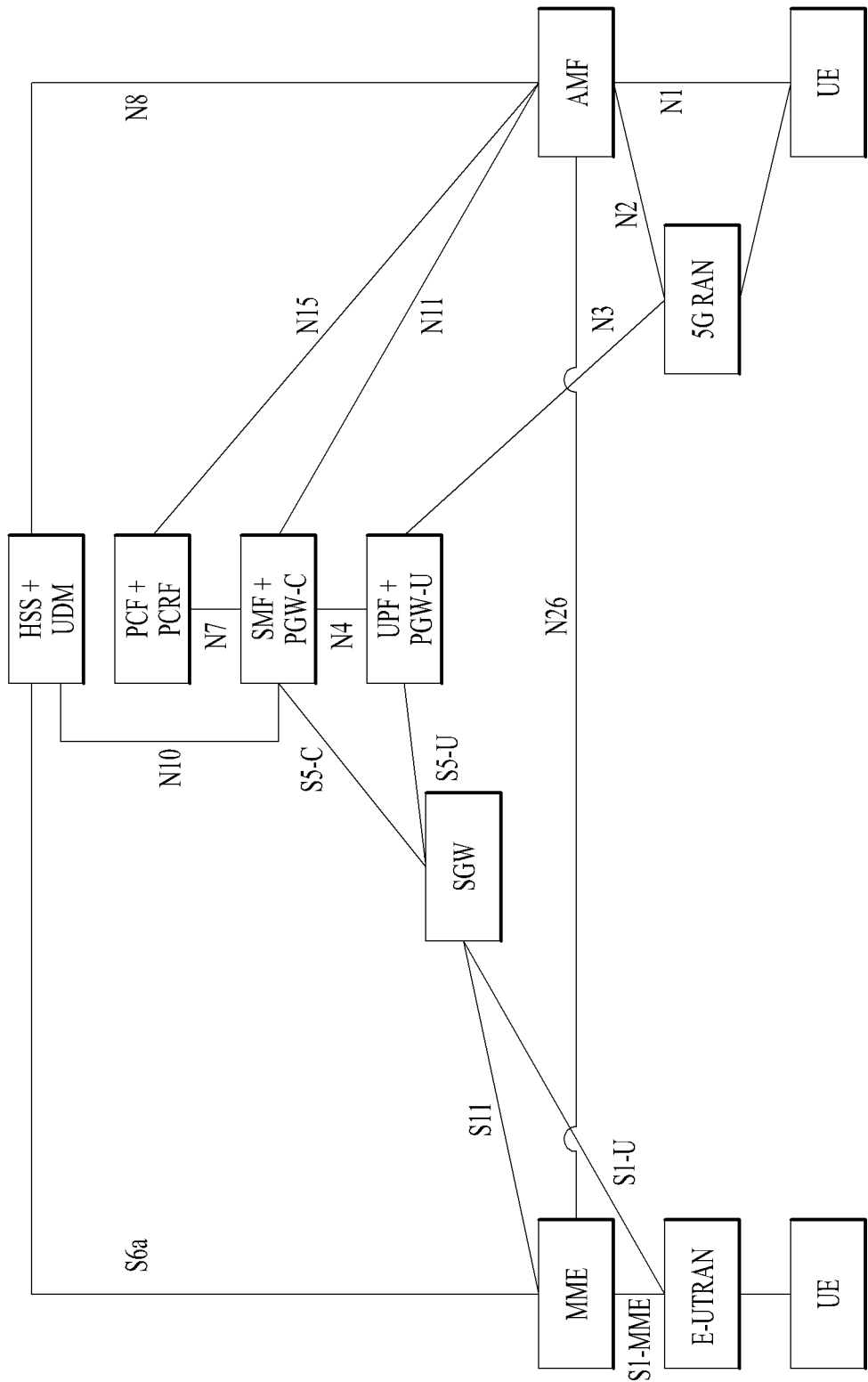
FIG. 9 shows an interworking structure between a 5G system and an EPS when a UE is not roaming.
Figure 10:
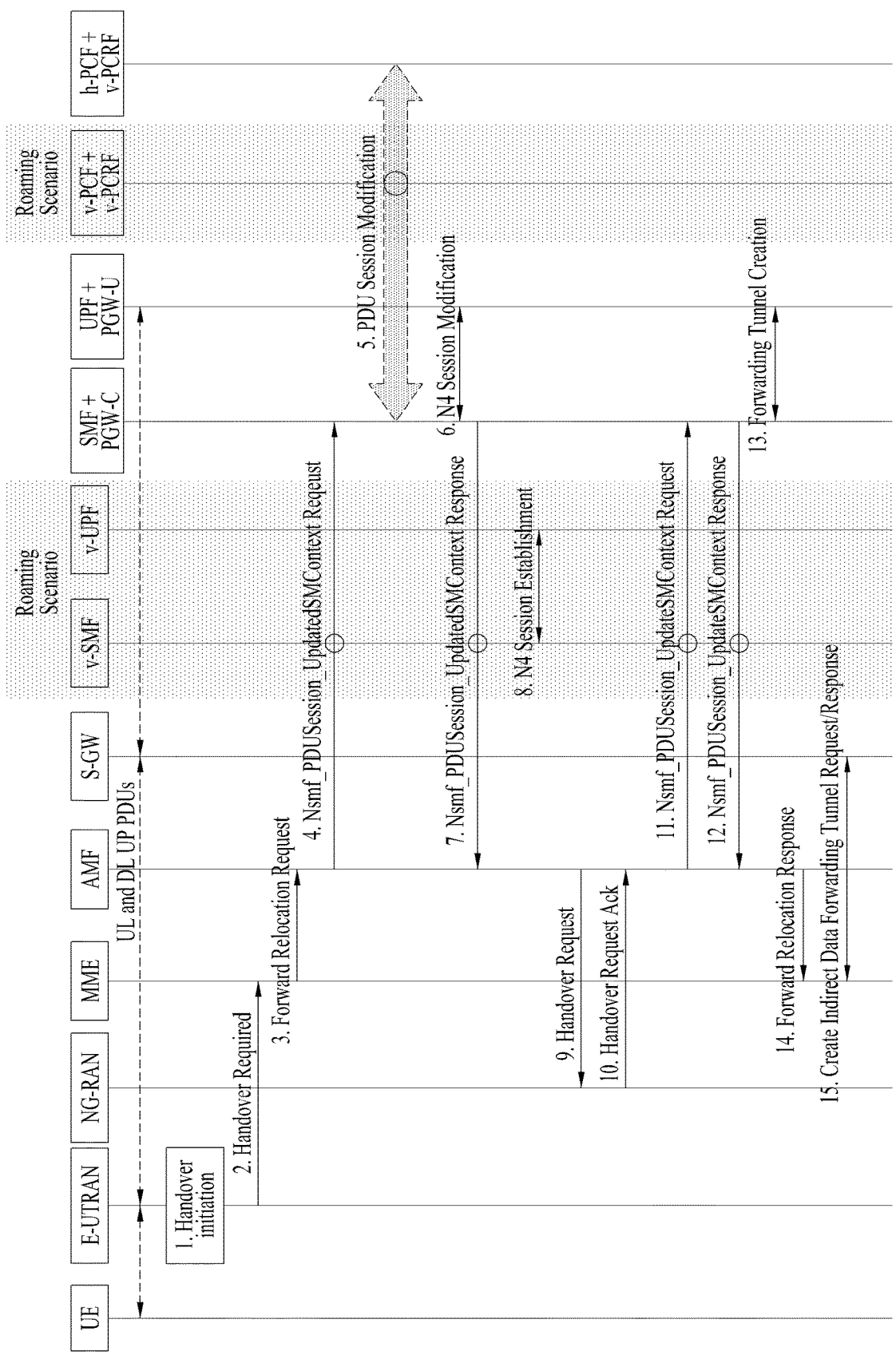
FIG. 10 and FIG. 11 show an EPS-to-5GS handover procedure.
Figure 11:
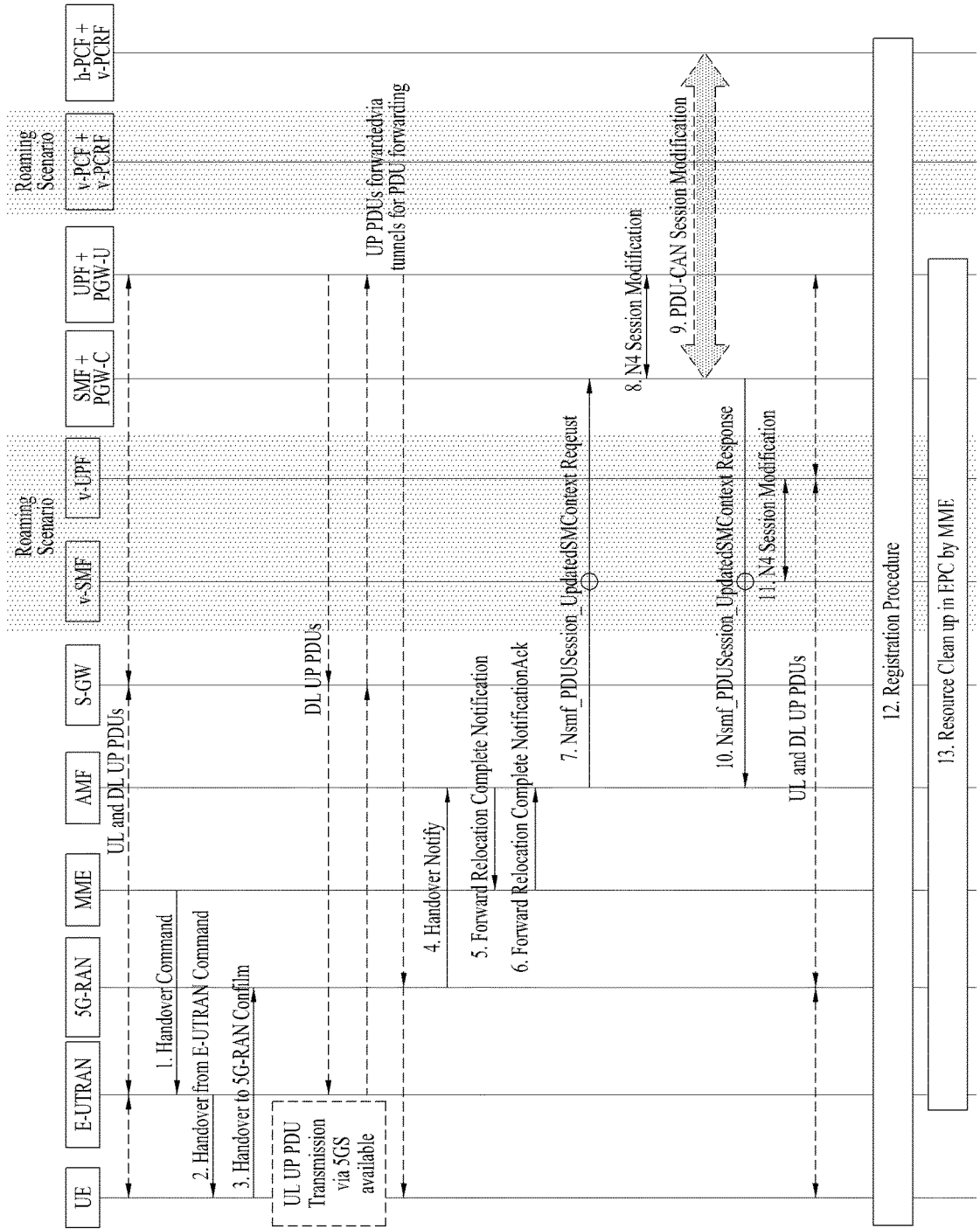

FIG. 9 shows an interworking structure between a 5G system and an EPS when a UE is not roaming. Details of FIG. 9 refer to TS 23.501. FIG. 10 shows an EPS-to-5GS handover procedure using N26 interface. Details of FIG. 10 refer to clause 4.11.1.2.2 of TS 23.503, which are introduced as the related art of the present disclosure. FIG. 10 shows a preparation step procedure of EPS-to5GS handover using N26 interface, and FIG. 11 shows a handover execution procedure. Details thereof refer to clause 4.11.1.2.2 of TS 23.503, which are introduced as the related art of the present disclosure.

Meanwhile, a UE may receive a service through 5G Core Network (5GC) in case of non-3GPP access apart from 3GPP access is receiving a service through which core network. This is possible through various scenarios. For example, a UE receives a service through N3IWF/5GC in case of non-3GPP access while receiving a service by attaching 3GPP access through E-UTRAN/EPC. For another example, a UE receives a service through 5GC for 3GPP access and non-3GPP access both and then receives a service by changing a system into E-UTRAN/EPC in case of 3GPP. In this case, AMF for serving the non-3GPP access is maintained as it is.

Thus, in case of making handover to 5GS from EPS for the 3GPP access while receiving a service through EPS in case of 3GPP access and a service through 5GC in case of non-3GPP access, in order to make a UE handover to 5GS, an MME selects a target AMF and then sends a Forward Relocation Request message to the selected AMF according to the step 3 (3. The MME selects the target AMF and sends a Forward Relocation Request (Target NG-RAN Node ID, Source to Target Transparent Container, EPS MM Context, EPS Bearer Context(s)) message to the selected AMF. The AMF converts the received EPS MM Context into the 5GS MM Context. The MME UE context includes IMSI, ME Identity, UE security context, UE Network Capability, and EPS Bearer context(s). An EPS Bearer context includes the common SMF+PGW-C address and V-CN Tunnel Info at the UPF+PGW-U for uplink traffic, and APN.) of the preparation step procedure for the EPS-to-5GS handover using the N26 interface in FIG. 10.

Yet, as the MME is unaware whether the UE is already receiving a service from 5GC for the non-3GPP access, the MME does not consider it in selecting a target AMF. Hence, despite that a prescribed AMF is serving the UE for the non-3GPP access, another AMF may be selected and service the UE for the 3GPP access. Moreover, although an AMF currently serving the UE for the non-3GPP access is selected accidently, the AMF may assign and give 5G-GUTI, which is a new temporary ID, to the UE (cf. step 12 of the handover execution procedure of FIG. 11). In this case, as a link for managing the two accesses for the UE collectively disappears, inefficiency rises despite that the two accesses are served by the same AMF.

Therefore, in case of moving/switching a 3GPP access to 5GS from EPS while receiving a service through EPS for the 3GPP access and a service through 5GC for a non-3GPP access, a signal transceiving method for solving the above problem is described as follows. A method of efficiently providing interworking between a 5G system (e.g., 5G mobile communication system, next generation mobile communication system, etc.) proposed by the present disclosure is configured with a combination of one or more operations/configurations/steps in the following description.

Embodiment 1

Embodiment 1 relates to signal transceiving, operations and the like of NF, UE and the like in a registration procedure related to the switching of 3GPP access from EPS to 5GS. This is described in detail with reference to FIG. 12.

Figure 12:
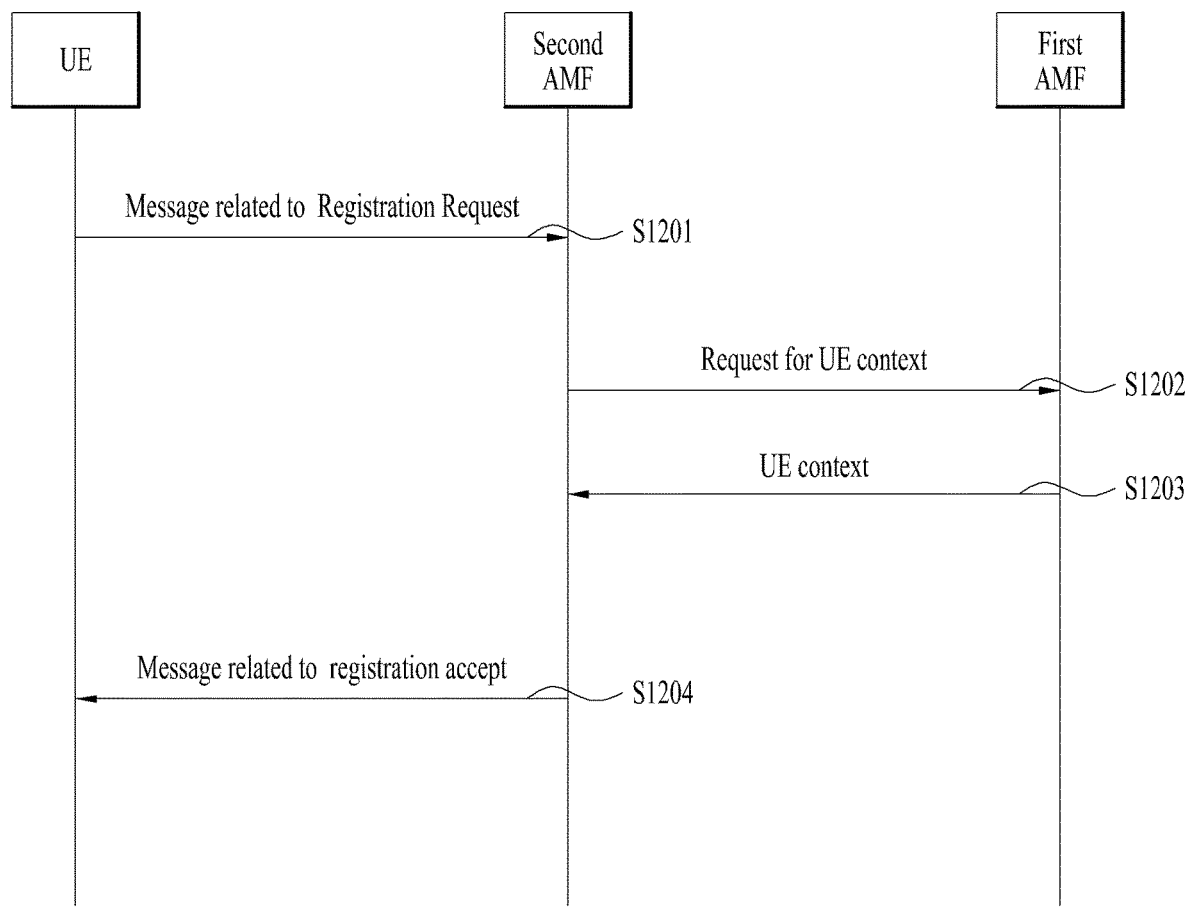
FIG. 12 shows an access switching related registration message transceiving procedure according to an embodiment of the present disclosure.
Figure 13:
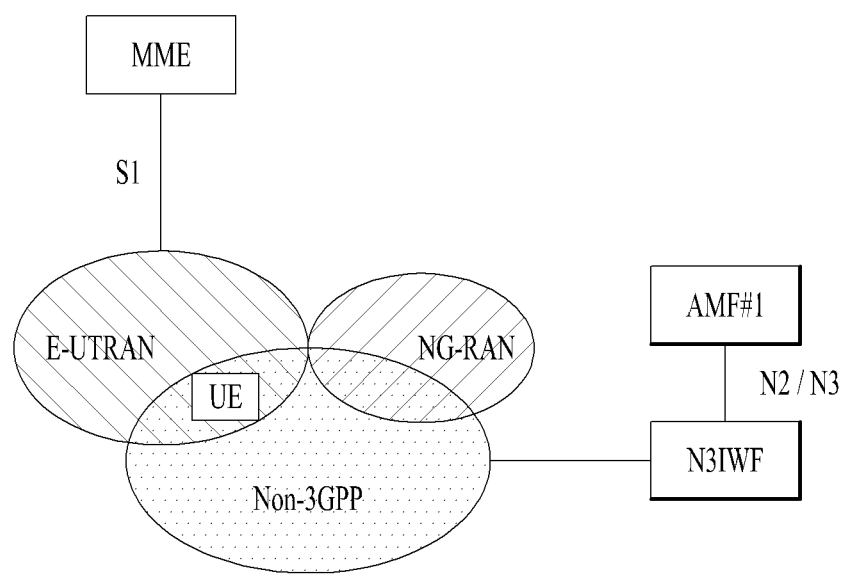
FIGS. 13 to 17 are diagrams to describe an embodiment of the present disclosure.
Figure 14:
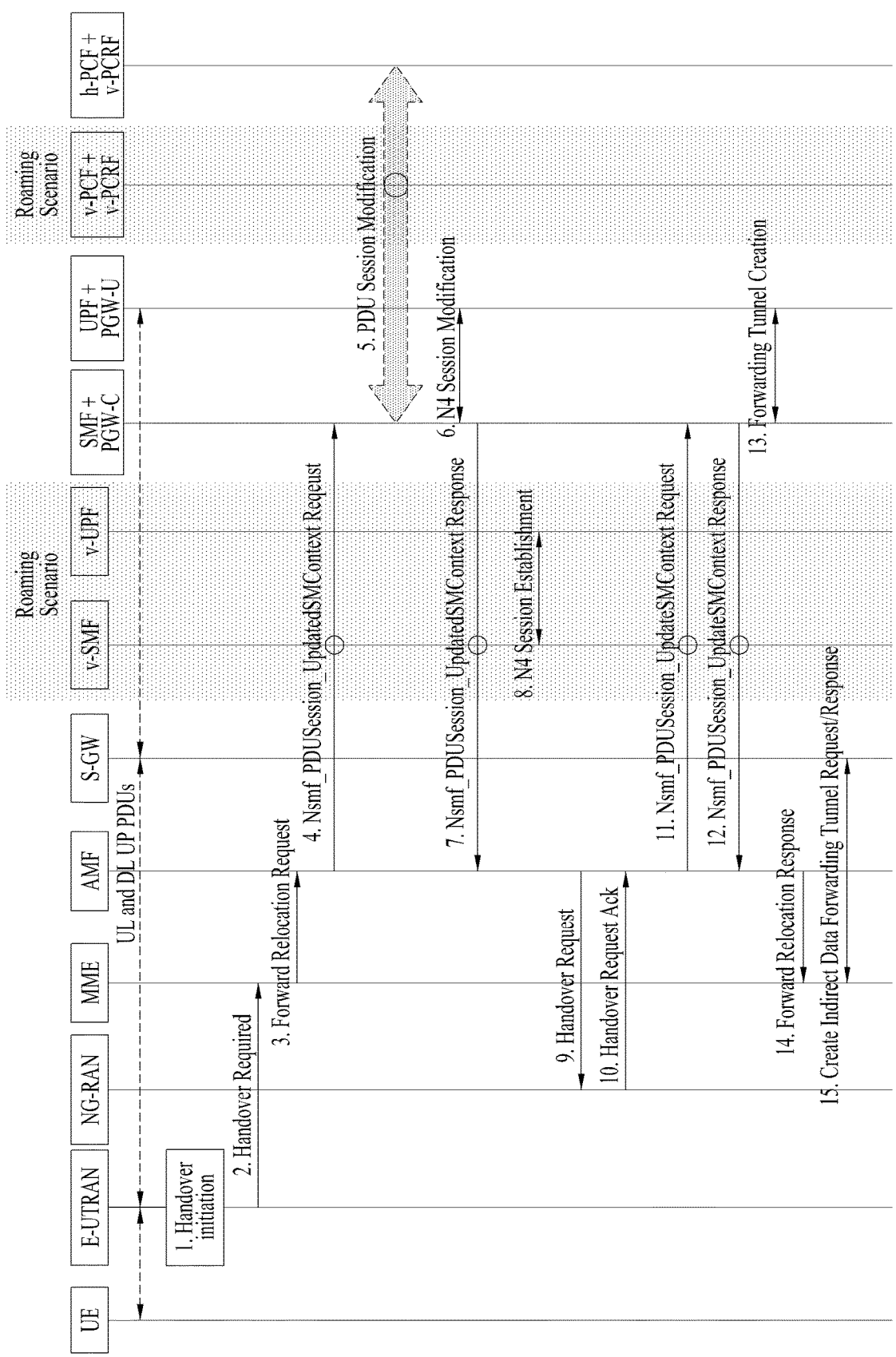
Figure 15:
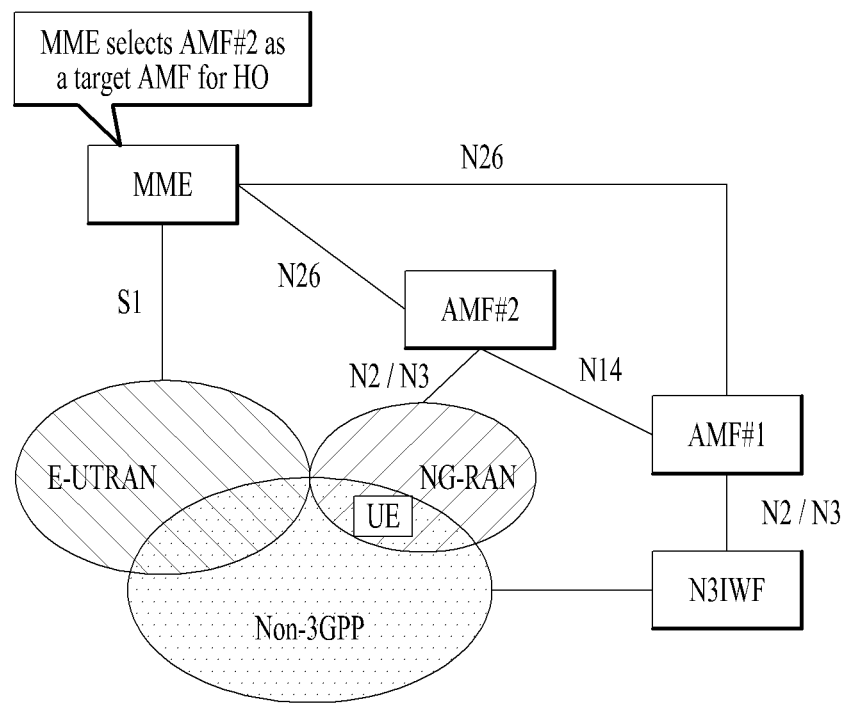
Figure 16:
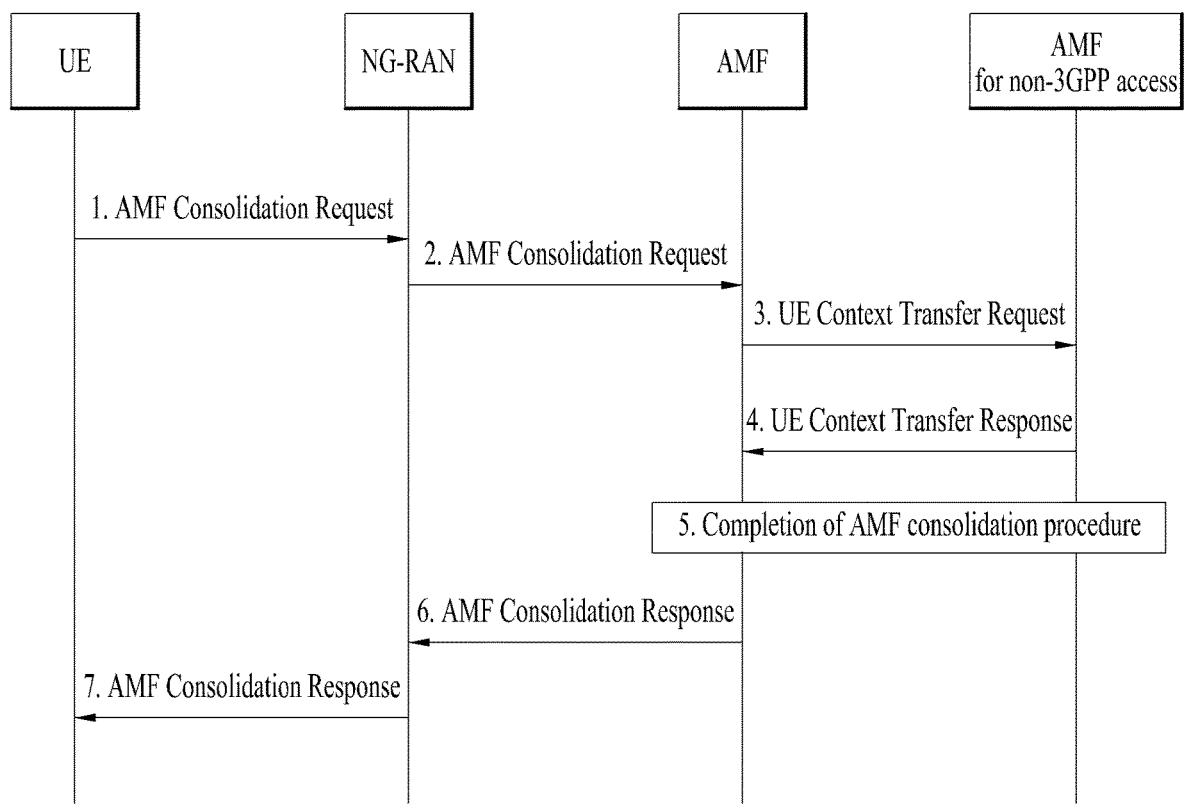
Figure 17:
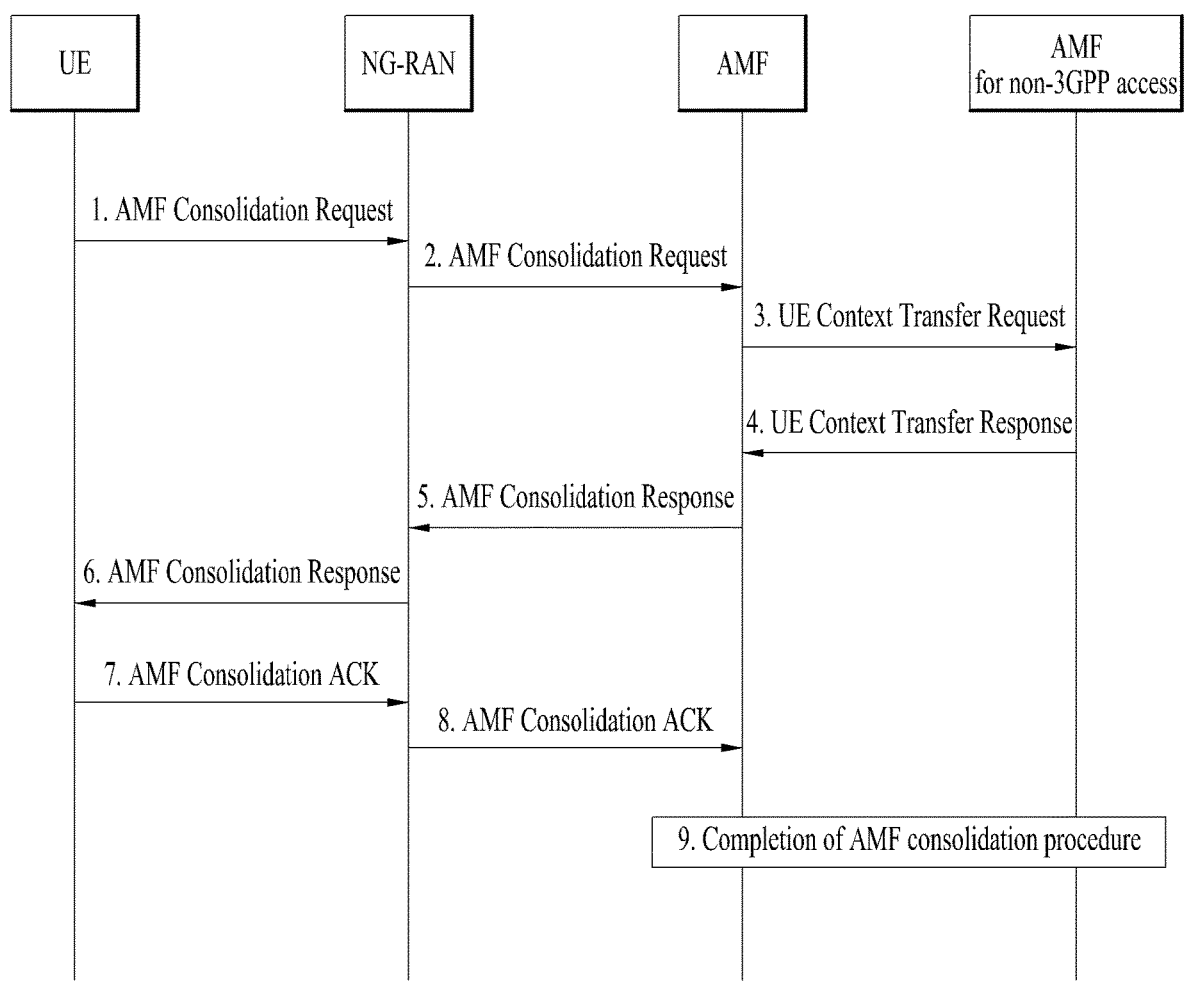

Referring to FIG. 12, a second AMF receives a message (e.g., registration request message) related to a registration request including a first 5G-GUTI [S1201]. Here, a UE may include a UE that receives a service of a non-3GPP access through 5GS and a 3GPP access through an EPS. In case that the 3GPP access is handed over to the EPS while receiving the services for the 3GPP access and the non-3GPP access through the 5GC, since PDU session(s) associated with the non-3GPP access should be left in the 5GS intactly (cf. TS 23.501, 5.17.3 Interworking with EPC in presence of Non-3GPP PDU Sessions), i.e., since the AMF serving the non-3GPP should be left for this (cf. TS 23.501, 5.17.2.2.2 Mobility for UEs in single-registration mode), the above situation may occur. The second AMF may send a message related to registration acceptance including a second 5G-GUTI to the UE [S1204]. Moreover, the first 5G-GUTI included in the registration request message may be included by the UE in case that the UE attempts to register with the 5GC through the 3GPP access of the same PLMN as registered with the 5GC through the non-3GPP access or that the UE makes a handover to the 3GPP access of the same PLMN as registered with the 5GC through the non-3GPP access.

Here, the first 5G-GUTI includes ID information of the first AMF serving the non-3GPP access of the UE and ID information of the second AMF serving both of the non-3GPP access and the 3GPP access of the UE. The second 5G-GUTI may include a 5G-GUTI generated from updating the first 5G-GUTI by the second AMF, a 5G-GUTI newly assigned by the second AMF, or a 5G-GUTI reassigned to replace the first 5G-GUTI.

Particularly, if the second AMF receives the message related to the registration request from the UE, the AMF identifies an AMF (i.e., the first AMF) that serves the non-3GPP access of the UE. This may be identified by the first 5G-GUTI or identified by information a) and information b) described later. Or, the AMF is aware that a non-3GPP AMF of the UE is present based on informations c) to e) described later and may request and obtain non-3GPP AMF information from a UDM. If the AMF is the non-3GPP AMF as well, it may recognize it by searching UE context stored in itself.

Having identified the second AMF that serves the non-3GPP access, the first AMF may make a request for transfer of context of the UE to the first AMF [S1202] and receive the context of the UE from the first AMD [S1203]. Namely, the second AMF requests and brings the UE context from the non-3GPP AMF, thereby becoming a serving AMF for the non-3GPP access after transferring the 3GPP access to the 5GS from the EPS. (If the UE is in CM-CONNECTED state for the non-3GPP access, the non-3GPP AMF may suspend handing over the UE context. Thereafter, if the UE enters CM-IDLE state for the non-3GPP access, it may hand over the UE context to the requesting AMF.)

Eventually, the second AMF becomes the serving AMF of the UE (in 5GS) for the non-3GPP access as well as for the 3GPP access. The second AMF registers with the UDM that it is a serving AMF for the UE's non-3GPP access. That is, the second AMF registers with the UDM as a serving AMF for the non-3GPP access and the 3GPP access of the UE. Therefore, if the first AMF differs from the second AMF, the first AMF is released from the serving AMF of the UE. If the non-3GPP first AMF was an AMF different from the second AMF, the non-3GPP first AMF will no longer serve the UE. If the UE has a PDU session associated with the non-3GPP access, a series of follow-up actions to serve the UE's non-3GPP, such as notifying that the AMF has been changed to its serving SMF, etc. are performed. Additionally, other network functions (e.g., N3IWF, SMSF, PCF, etc.) that need to be notified of the AMF change may also be notified.

The second AMF may inform the UE explicitly (or implicitly) that it has also been served for non-3GPP access when sending a message (Registration Accept message) relating to registration acceptance. That is, the message relating to the registration acceptance may include information indicating that the second AMF serves the non-3GPP access of the UE. The UE may identify the 5G-GUTI that it will need to use in the future (for both accesses at the corresponding PLMN) through this information or the information on the allocation/invalid of the 5G-GUTI mentioned above. In addition, the UE may see what the context (including security context/parameters) it needs to use in the future (for both accesses at the corresponding PLMN), i.e., that it should use the context obtained/determined upon registration through 3GPP access.

As described above, when the UE receives the service of the non-3GPP access through the 5GS and the service of the 3GPP access through the EPS switches the 3GPP access to the 5GS, the second AMF becoming the serving AMF for the 3GPP access becomes a serving AMF for the existing non-3GPP access. In this case, it is able to prevent an AMF different for each of 3GPP access and non-3GPP access in 5GS from serving one UE. If one AMF becomes a serving AMF for both 3GPP access and non-3GPP access, it is more efficient than different AMFs serve 3GPP access and non-3GPP access, respectively, in processing an end call for the non-3GPP access, performing deregistration on two accesses at a time, etc. Particularly, when a UE is in CM-IDLE state for non-3GPP access, if mobile terminating traffic or signaling for the non-3GPP access occurs, an AMF informs the UE of such occurrence through 3GPP access, whereby a service can be initiated. In this case, when different AMFs serve for two accesses, respectively and a UE enters a CM-IDLE state for the non-3GPP access, if mobile terminating traffic or signaling for the non-3GPP access occurs, there is no way in informing the UE of such occurrence. Thus, if one AMF is a serving AMF for both 3GPP access and non-3GPP access, such a problem can be solved.

The 3GPP access and the non-3GPP access may be located at the same PLMS. Namely, 3GPP access and Non-3GPP InterWorking Function (N3IWF) may be located at the same PLMN. For reference, as a method of determining a case that a UE attempts to register with 5GC through 3GPP access of the same PLMN as registered with the 5GC through non-3GPP access (or a case that a UE makes a handover to 3GPP access of the same PLMN as registered with the 5GC through the non-3GPP access), there may be system information/signaling based on information included in the message received in the step 2 of FIG. 11 or system information/signaling obtained from a target NG-RAN to which the UE will make a handover.

The message related to the registration request may include one or more of the following informations a) to e).

a) 5G-GUTI assigned from AMF when a UE registers with 5GC through non-3GPP access. Information explicitly or implicitly indicating that the 5G-GUTI is temporary ID of a UE for non-3GPP access additionally/optionally.

b) ID (GUAMI) of an AMF serving for non-3GPP access of a UE: This is extractable from 5G-GUTI assigned to the UE from the corresponding AMF. This information explicitly or implicitly indicates that the AMF ID is a serving AMF information of a UE for non-3GPP access additionally/optionally.

c) Information indicating that a UE has registered with 5GC for non-3GPP access.

d) Information requesting to move context related to non-3GPP access of a UE.

e) Information requesting to serve 3GPP access and non-3GPP access of a UE together.

As additional information for including the informations a) to e), it is able to consider a case that a UE is in CM-IDLE state for non-3GPP access. Namely, in case of CM-CONNECTED for non-3GPP access, a registration update operation can be performed without including the above information.

If the AMF is a non-3GPP AMF, it already has a UE context for the non-3GPP access. Hence, it is unnecessary to perform the operation relating to becoming a serving AMF for the above-mentioned UE's non-3GPP access. Instead, when the UE makes registration through the non-3GPP access, a UE may be allowed to use 5G-GUTI assigned upon registration through the non-3GPP access (i.e., without newly assigning it for 3GPP access). On the contrary, a new 5G-GUTI is assigned for 3GPP access and a previous 5G-GUTI assigned for the non-3GPP access may be made invalid. Thus, the UE may be informed of such assignment/invalid issue of the 5G-GUTI (through Registration Accept message).

If the AMF is different from a non-3GPP AMF, the UE may be informed that the 5G-GUTI assigned by the non-3GPP AMF is invalid through Registration Accept message). If the 5G-GUTI is invalid, it may implicatively indicate that the context (security context/parameter included) of the access associated with 5G-GUTI is invalid. And, the AMF may explicitly inform the UE of it separately. Alternatively, new 5G-GUTI is assigned and all the previously assigned 5G-GUTI may be made invalid. This may apply to the present disclosure overall.

In the above description, a method of determining a case that a UE attempts to register with 5GC through 3GPP access of the same PLMN as registered with the 5GC through non-3GPP access (or a case that a UE makes a handover to 3GPP access of the same PLMN as registered with the 5GC through the non-3GPP access) may be based on information included in the message received in the step 2 of FIG. 11 or system information/signaling obtained from a target NG-RAN to which the UE will make a handover.

The 5G-GUTI is the ID including Globally Unique AMF Identifier that identifies assigned ID of an AMF, which is assigned by the AMF. 5G-GUTI is defined in TS 23.501 as Table 2 in the following.

TABLE 2

The AMF shall allocate a 5G Globally Unique Temporary Identifier (5G-GUTI) to the UE that is common to both 3GPP and non-3GPP access. It shall be possible to use the same 5G-GUTI for accessing 3GPP access and non-3GPP access security context within the AMF for the given UE. An AMF may re-assign a new 5G-GUTI to the UE at any time. The AMF may delay updating the UE with its new 5G-GUTI until the next NAS transaction. The 5G-GUTI shall be structured as:
<5G-GUTI> := <GUAMI> <5G-TMSI>
where GUAMI identifies the assigned AMF and 5G-TMSI identifies the UE uniquely within the AMF.
The Globally Unique AMF ID (GUAMI) shall be structured as:
<GUAMI> := <MCC> <MNC> <AMF Region ID> <AMF Set ID> <AMF Pointer>
where AMF Region ID identifies the region, AMF Set ID uniquely identifies the AMF Set within the AMF Region and AMF Pointer uniquely identifies the AMF within the AMF Set.
NOTE 1: The AMF Region ID addresses the case that there are more AMFs in the network than the number of AMFs that can be supported by AMF Set ID and AMF Pointer by enabling operators to re-use the same AMF Set IDs and AMF Pointers in different regions.
NOTE 2: See TS 23.003 [19] for details on the structure of the fields of GUAMI. The 5G-S-TMSI is the shortened form of the GUTI to enable more efficient radio signalling procedures (e.g. during Paging and Service Request) and is defined as:
<5G-S-TMSI> := <AMF Set ID> <AMF Pointer> <5G-TMSI>
Editor's note: The structures of 5G-GUTI, GUAMI and 5G-S-TMSI can be removed once formally defined in TS 23.003.

The above registration procedure may correspond to a registration procedure performed in the EPS to 5GS handover using N26 interface described in TS 23.502. According to TS 23.502, EPS to 5GS handover using N26 interface and preparation phase (clause 4.11.1.2.2.2) of FIG. 10 is performed and EPS to 5GS handover using N26 interface and execution phase (clause 4.11.1.2.2.3) is performed. In doing so, a registration procedure mentioned in the following may be performed together with the above registration procedure. Therefore, the procedure related to the EPS to 5GS handover using N26 interface refers to the contents disclosed in TS 23.502.

Although the above operation may be performed during the registration procedure, it may be progressed apart from the registration procedure. If so, although the operation related to the identification of the first AMF, the operation related prior to the UE context, and/or the operation of registering with UDM that it is the serving AMF for the UE's non-3GPP access is not completed, the second AMF may explicitly or implicitly inform the UE that it will be also served for the non-3GPP access, through the Registration Accept message. Alternatively, after completion of the operation related to the identification of the first AMF, the operation related prior to the UE context, and/or the operation of registering with UDM that it is the serving AMF for the UE's non-3GPP access, the second AMF may explicitly or implicitly inform the UE that it will be also served for the non-3GPP access, through a separate NAS message.

Embodiment 2

After the end of the EPS to 5GS handover using N26 interface, execution phase described in TS 23.502 (shown in FIG. 11), in case that a UE registers with 5GC through 3GPP access of the same PLMN as registered with the 5GC through non-3GPP access (or that a UE makes a handover to 3GPP access of the same PLMN as registered with the 5GC through the non-3GPP access), the following is performed. The UE is regarded as receiving assignment of 5G-GUTI from an AMD serving the 3GPP access (hereinafter, 3GPP AMF) as a result of the handover from the EPS to the 5Gs (through the step 12 of FIG. 11). If the above-described 5G-GUTI assigned from the 3GPP AMF is identical to the 5G-GUTI previously assigned upon the UE's previous registration with the 5GC through the non-3GPP access, the UE skips he following operation. (Namely, as the 3GPP AMF described in Embodiment 1 is a non-3GPP AMF as well, the 5G-GUTI, which was assigned when the UE registered through the non-3GPP access, is allowed to be usable for 3GP access as well.)

A) A UE sends an NAS message including one or more of the following informations to a 3GPP AMF. The NAS message may include an NAS message newly defined for the present disclosure, e.g., an AMF consolidation request message or a conventional NAS message, e.g., a registration request message.

(1) 5G-GUTI assigned to a UE from a 3GPP AMF. Information explicitly or implicitly indicating that the 5G-GUTI is temporary ID of the UE for 3GPP access additionally/optionally.

(2) 5G-GUTI assigned to a UE from a non-3GPP AMF. Information explicitly or implicitly indicating that the 5G-GUTI is temporary ID of the UE for non-3GPP access additionally/optionally.

(3) ID (GUAMI) of a non-3GPP AMF of a UE: This is extractable from 5G-GUTI assigned to the UE from the corresponding AMF. This information explicitly or implicitly indicates that the AMF ID is a serving AMF information of a UE for non-3GPP access additionally/optionally.

(4) Information indicating that a UE has registered with 5GC for non-3GPP access.

(5) Information requesting to move context related to non-3GPP access of a UE.

(6) Information requesting to serve 3GPP access and non-3GPP access of a UE together.

The NAS message is sent via NG-RAN, and a UE sends the NAS message in a manner that the NAS message is included in an AS message (e.g., RRC message) sent to the NG-RAN. Here, 5G-GUTI corresponding to a temporary ID assigned from 3GPP AMF, GUAMI extracted from the 5G-GUTI, or 5G-S-TMSI extracted from the 5G-GUTI is included in the AS message, thereby enabling the NG-RAN to identify a serving 3GPP AMD of the UE.

As an additional condition for the UE to send the NAS message to the 3GPP AMF, a case that the UE is in CM-IDLE state for the non-3GPP access may be considered. Thus, if the UE is in CM-CONNECTED state for the non-3GPP access, the UE skips sending the NAS message to the 3GPP AMF. If the UE enters CM-IDLE from CM-CONNECTED for the non-3GPP access, the UE sends the NAS message to the 3GPP AMF.

In case of using a newly defined NAS message as the NAS message, when the UE intends to send the NAS message, if the UE is in CM-IDLE state in the 3GPP access (e.g., since the 3GPP access may enter the CM-IDLE state as waiting for the non-3GPP access to become the CM-IDLE state), the UE may switch to the CM-CONNECTED state and then send the NAS message, or may directly send the NAS message in the CM-IDLE state.

B) If the 3GPP AMF receives the NAS message from the UE, it performs the following operation. Such an operation will be referred to as a consolidation operation of the AMF.

I) The 3GPP AMF identifies a non-3GPP AMF of the UE. The reason for this is that the UE includes identification information of the non-3GPP AMF like (2) or (3). Otherwise, the 3GPP AMF is aware that the non-3GPP AMF of the UE is present based on the informations (4) to (6) and may then request and obtain non-3GPP AMF information from UDM. If the 3GPP AMF is a non-3GPP AMF as well, it may recognize it by searching UE context stored in itself.

II) The 3GPP AMF requests the UE context and then brings it from the non-3GPP AMF. If the UE is in CM-CONNECTED state for the non-3GPP access, the non-3GPP AMD may suspend handing over the UE context. Thereafter, if the UE enters the CM-IDLE state for non-3GPP access, the UE context may hand the UE context over to the requesting 3GPP AMF.

If the 3GPP AMF is also the non-3GPP AMF, it already has the UE context for the non-3GPP access. Hence, it is unnecessary to perform the following operation III). Instead, 5G-GUTI assigned previously for the non-3GPP access may be made invalid. The UE may be informed of such an invalid issue of the 5G-GUTI (through a response message of IV).

If the 3GPP AMF is different from the non-3GPP AMF, the UE may be informed that the 5G-GUTI assigned by the non-3GPP AMF is invalid (through a response message of IV).

If the 5G-GUTI is invalid, it may implicatively indicate that the context (security context/parameter included) of the access associated with 5G-GUTI is invalid. And, the AMF may explicitly inform the UE of it separately.

III) Eventually, the 3GPP AMF becomes a serving AMF for non-3GPP access of the UE as well as for 3GPP access. Therefore, the AMF registers with UDM that the AMF is the serving AMF for the non-3GPP access of the UE. And, in case that the UE has a PDU session associated with the non-3GPP access, the AMF performs a series of follow-up actions for serving the non-3GPP access of the UE, such as notifying that the AMF has been changed to a serving AMF thereof. Additionally, it is notified to other network functions (e.g., N3IWF, SMSF, PCF, etc.) to which the change of the AMF should be notified. If the original non-3GPP AMF is an AMF different from the corresponding AMF, the non-3GPP AMF no longer serves the UE.

IV) The 3GPP AMF sends a response to the received NAS message to the UE. Through the response, it can be explicitly or implicitly announced that the 3GPP AMF now serves for the non-3GPP access.

C) Through IV) of B) or the information on the invalid issue of the 5G-GUTI, the UE can identify 5G-GUTI to use in the future (for tow accesses at the corresponding PLMN). Thus, the 5G-GUTI to use in the future may be assigned through the step 12 of FIG. 11. And, the UE can be aware what is the context (security context/parameter included) to use in the future (for two accesses at the corresponding PLMN), i.e., that the context obtained/determined upon registration through 3GPP access should be used.

Eventually, owing to the above-described AMF consolidation operation, for 3GPP access and non-3GPP access pertaining to the same PLMN, a single AMF manages a UE with the same temporary ID (i.e., 5G-GUTI).

Embodiment 3

When A) is performed on the same condition of Embodiment 2, Embodiment 3 differs from Embodiment 2 in that a UE sends an NAS message not to a 3GPP AMF but to a non-3GPP AMF. So, in the description in A) of Embodiment 2, 3GPP should be interpreted as non-3GPP, and vice versa. NG-RAN should be interpreted in a manner of being substituted with N3IWF and an AS message becomes a message sent to the N3IWF. In the description in B) of Embodiment 2, 3GPP should be interpreted as non-3GPP, and vice versa. N3IWF should be interpreted in a manner of being substituted with NG-RAN.

Eventually, unlike Embodiment 2, a non-3GPP AMF serves for 3GPP access of a UE.

Embodiment 4

According to Embodiment 2, a UE sends the NAS message of A) to a 3GPP AMF. According to Embodiment 3, a UE sends the NAS message of A) to a non-3GPP AMF. On the contrary, when one of two accesses is in CM-IDLE state and the other is in CM-CONNECTED state, a UE sends the NAS message to an AMF of the access in CM-CONNECTED state. Therefore, the AMF of the access in CM-CONNECTED state still serves for the access in CM-IDLE. If the AMF to which the NAS message is sent is a 3GPP AMF, the description of Embodiment 2 applies. If the AMF to which the NAS message is sent is a non-3GPP AMF, the description of Embodiment 3 applies.

How a UE operates according to which one of Embodiments 2 to 4 may be configured in the UE or indicated by a network.

Embodiments 2 to 4 may be used to solve the problems due to the interworking between the 5GS and the EPS. And, Embodiments 2 to 4 may be used to solve the problems in case 1) that different AMFs are selected as serving AMFs for accesses, respectively (i.e., a case that a UE can recognize that different AMFs are serving two accesses because AMF IDs of 5G-GUTI assigned by an AMF, i.e., GUAMI informations are different from each other) or case 2) of assigning a different 5G-GUTI for each access, as a result of performing simultaneous registration (including initial registration and re-registration both) with 5GC through 3GPP access and non-3GPP access pertaining to the same PLMN. In this case, after the UE has finished the registration procedure through the two accesses, if the UE recognizes the above situation, i.e., 1) or 2), 'A)' described in Embodiments 2 to 4 is performed. And, as described in 'B)' of Embodiments 2 to 4, the AMF having received the NAS message from the UE performs an operation of consolidating the AMF for the two accesses. Thereafter, as described in 'C' of Embodiments 2 to 4, the UE is served through one AMF for the two accesses.

Tables 3 to 5 in the following are the contribution submitted to 3GPP by the inventor of the present disclosure in association with the aforementioned embodiments. In Tables 3 to 5, FIG. 1, FIG. 2, FIG. 4.11.1.2.2.2-1, FIG. 4.11.1.x-1, and FIG. 4.11.1.x-2 correspond to FIGS. 13 to 17, respectively.

TABLE 3

1. Discussion
The following scenario may happen:
1) The UE connects to 5GC over non-3GPP access/N3IWF while connecting to EPC over E-UTRAN as shown in FIG. 1. In this scenario, it is assumed that EPS and 5GS including 3GPP and non-3GPP accesses are in same PLMN.
2) The network hands over PDN Connections for the UE from EPC/E-UTRAN to 5GC/NG-RAN by using N26, e.g. due to the UE moving into NG-RAN coverage.
In this case, the procedures described in clause 4.11.1.2.2 'EPS to 5GS handover using N26 interface' are used for handover.
3. The MME selects the target AMF and sends a Forward Relocation Request (Target NG-RAN Node ID,
Source to Target Transparent Container, EPS MM Context, EPS Bearer Context(s)) message to the selected AMF.
According to step 3 of the above HO preparation procedure, the MME may select AMF#2 as a target AMF for handover because the MME has no knowledge that AMF#1 is serving the UE for non-3GPP access as shown in FIG. 2.
In this case, AMF consolidation (i.e. AMF relocation) needs to be considered for unified management of the UE in the same PLMN so that the UE can be served by a single AMF.
Observation#1: The MME may select the other AMF for handover to 5GC/NG-RAN using N26 than the serving AMF over non-3GPP access although NG-RAN is in the same PLMN as the non-3GPP access because the MME has no knowledge whether the UE connects to 5GC over non-3GPP and in this case which AMF is the serving AMF.
Proposal#1: AMF consolidation (i.e. AMF relocation) needs to be considered for unified management of the UE in the same PLMN if different AMF gets the serving AMF for 3GPP access than the serving AMF for non-3GPP after EPS to 5GS handover using N26 interface.
When and who initiates AMF consolidation procedure is a question.
Regarding "when", two cases can exist after EPS to 5GS handover using N26 interface.
a) CM-IDLE over non-3GPP access
b) CM-CONNECTED over non-3GPP access
In case a), it is considered that AMF consolidation is required to use paging or NAS notification over 3GPP access for the PDU Session(s) associated with non-3GPP access.
In case a), it is considered that AMF consolidation is not necessarily required because the UE is likely in coverage of non-3GPP access and MT traffic for the PDU Session(s) associated with non-3GPP access can be delivered over non-3GPP access. However, when the UE becomes CM-IDLE later, AMF consolidation is considered required due to the reason described above.
Proposal#2: AMF consolidation is required when the UE is CM-IDLE over non-3GPP access when the EPS to 5GS handover using N26 interface is completed or when the UE becomes CM-IDLE over non-3GPP access after the EPS to 5GS handover using N26 interface is completed,
Regarding "who", we think the UE can initiate AMF consolidation procedure after completing the EPS to 5GS handover using N26 interface when the following conditions are fulfilled:
the UE is simultaneously connected to the same 5G Core Network of a PLMN over a 3GPP access and a non-3GPP access;
the 5G-GUTI received from the AMF after the EPS to 5GS handover using N26 UE receives is different to the 5G-GUTI from the AMF as a result of the Registration procedure over non-3GPP access; and
the UE is in CM-IDLE state in non-3GPP access or the UE becomes CM-IDLE state in non-3GPP access.
For the UE to initiate AMF consolidation to the network, we propose that the UE sends an AMF Consolidation Request message to the AMF serving 3GFP access by including the 5G-GUTI received from the AMF serving non-3GPP access

45

TABLE 4 so that the AMF serving 3GPP access acquires UE contexts from the AMF serving non-3GPP access and serves the UE for non-3GPP access as well.
Proposal#3: The UE sends an AMF Consolidation Request message to the AMF serving 3GPP access by including the 5G-GUTI received from the AMF serving non-3GPP access so that the AMF serving 3GPP access acquires UE contexts from the AMF serving non-3GPP access and serves the UE for non-3GPP access as well.
2. Proposal
Based on the discussion above, it is proposed to add the following changes into TS 23.502.
** Start of 1st Change **
4.11.1.x AMF Consolidation procedure
The UE initiates AMF Consolidation procedure after completing the EPS to 5GS handover using N26 interface described in clause 4.11.1.2.2 when the following conditions are fulfilled:
the UE is simultaneously connected to the same 5G Core Network of a PLMN over a 3GPP access and a non-3GPP access;
the 5G-GUTI received from the AMF after the EPS to 5GS handover using N26 UE receives is different to the 5G-GUTI from the AMF as a result of the Registration procedure over non-3GPP access; and
the UE is in CM-IDLE state in non-3GPP access or the UE becomes CM-IDLE state in non-3GPP access.
The AMF Consolidation procedure is illustrated in FIG. 4.11.1.x-1.
1. UE to NG-RAN: AN message (AN parameters, NAS AMF Consolidation Request (5G-GUTI, 5G-GUTI for non-3GPP access)):
The AN parameters include the 5G-GUTI for 3GPP access that tire UE received from the AMF serving for 3GPP access.

TABLE 4-continued

The 5G-GUTI is included in the AMF Consolidation Request message and it indicates the serving AMF for 3GPP access. The 5G-GUTI for non-3GPP access is also included in the AMF Consolidation Request message and it indicates the serving AMF for non-3GPP access.
2. NG-RAN to AMF: N2 message (N2 parameters, NAS AMF Consolidation Request (5G-GUTI, 5G-GUTI for non-3GPP access)).
The N2 parameters include the Selected PLMN ID, Location Information, Cell Identity and the RAT type related to the cell in which the UE is camping.
3. AMF to AMF for non-3GPP access (i.e. non-3GPP AMF): UE Context Transfer Request ( ).
The AMF sends a UE Context Transfer Request message to non-3GPP AMF identified by the 5G-GUTI for non-3GPP access. The UE Context Transfer Request message includes the complete AMF Consolidation Request IE, which may be integrity protected or the UE's SUPI, to request the UE contexts. The UE Context Transfer Request message may include the Access Type = non-3GPP access indicating that the UE contexts associated with non-3GPP access is requested. The non-3GPP AMF uses the integrity protected complete Registration request IE or the UE's SUPI to verify if the context transfer request corresponds to the UE requested.
The non-3GPP AMF also transfers the event subscriptions information by each consumer NF, for the UE, to the AMF.
4. Non-3GPP AMF to AMF: UE Context Transfer Response ( ).

TABLE 5

The non-3GPP AMF responds to the AMF with a UE Context Transfer Response message by including the UE contexts. The UE contexts may include all UE's context information (subscriber information, MM context, SM context, SMS context, etc.) stored by a non-3GPP AMF.
If the non-3GPP AMF holds information about established PDU Sessions, the non-3GPP AMF includes SMF information including S-NSSAI, SMF identities and PDU Session ID.
Namf_Communication_UEContextTransfer service operation may be used in Step 4 and Step 5.
5. The AMF and non-3GPP AMF perform operations to complete the AMF Consolidation procedure.
This step includes some or all of step 14 of clause 4.2.2.2.2. Also, step 16, step 17 and/or step 20 of clause 4.2.2.2.2 can be performed if the condition described in such step is fulfilled.
6-7. AMF to UE: AMF Consolidation Response (Cause).
The AMF sends an AMF Consolidation Response message to the UE. The cause included in the AMF Consolidation Response message indicates that the AMF consolidation request has been successfully completed or not.
If a failing operation occurs in the course of performing an AMF consolidation request operation, the AMF may execute Step 6 instantly.
If the AMF consolidation operation is successful, the AMF may send a message (e.g., UE Context Transfer Complete) indicating that the UE Context Transfer operation is completed to the non-3GPP AMF after Step 5. On the contrary, if the AMF Consolidation Operation fails, the AMF may send a message indicating that the UE Context Transfer operation is incomplete to the non-3GPP AMF. In this case, the non-3GPP AMF continues to serve the non-3GPP access side for the UE.
The alternative AMF Consolidation procedure is illustrated in FIG. 4.11.1 .x-2.
1-4. Same to steps 1 to 4 of FIG. 4.11.1.x-1.
5-6. Same to steps 6 to 7 of FIG. 4.11.1.X-1.
7-8. The UE sends an AMF Consolidation ACK message to the AMF to acknowledge if the AMF consolidation request has been successfully completed. Yet, the ACK message may be sent by the UE (based on the response message received in Step 6) even if the UE's AMF consolidation request fails on a network.
9. Same to step 5 of FIG. 4.11.1.x-1.
For Steps 5 to 8, a conventional NAS message 'UE Configuration Update command/complete (cf. clause 4.2.4.2 of TS 23.502)' may be used.
If the AMF consolidation operation is successful, the AMF may send a message (e.g., UE Context Transfer Complete) indicating that the UE Context Transfer operation is completed to the non-3GPP AMF after Step 8 or Step 9. On the contrary, if the AMF Consolidation Operation fails, the AMF may send a message indicating that the UE Context Transfer operation is incomplete to the non-3GPP AMF. In this case, the non-3GPP AMF continues to serve the non-3GPP access side for the UE.

Figure 18:
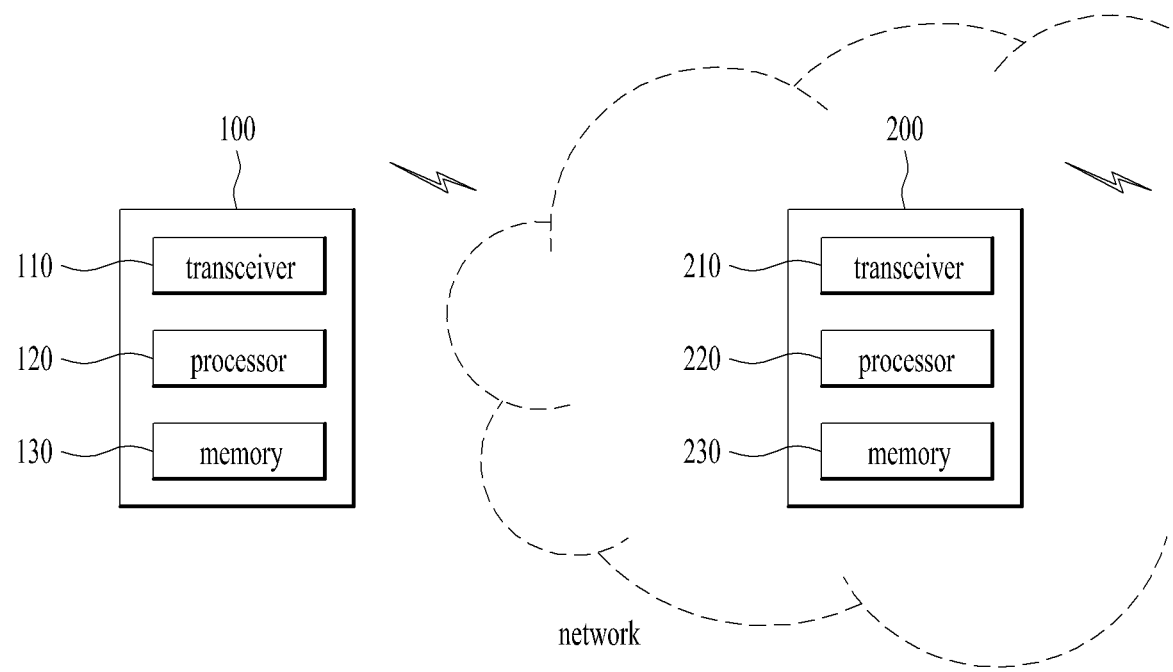
FIG. 18 is a diagram illustrating a configuration of a node device according to an embodiment of the present disclosure.

FIG. 18 is a diagram illustrating configurations of a UE and a network node according to one example of the present disclosure.

Referring to FIG. 9, a network node 200 according to the present disclosure may include a transceiver 210 and a device 220 for a wireless communication system. The device 220 for the wireless communication system may include a memory and at least one processor coupled to the memory. The transceiver 210 may be configured to transmit various signals, data and informations to an external device and receive various signals, data and informations from the external device. The network node 200 may be connected to the external device by wire and/or wireless. The at least one processor may control overall operations of the network node 200 and may be configured to perform a function of operating information to be transceived with the external device by the network node 200 and the like. The memory may store the operated information and the like for a prescribed time and may be substituted with a component such as a buffer (not shown) and the like. And, the processor may be configured to perform network node operations proposed by the present disclosure.

Particularly, regarding the at least one processor, a second AMF receives a message related to a registration request including a first 5G-GUTI from a UE receiving a service of non-3GPP access through a 5GS and a service of 3GPP access through an EPS, the second AMF sends a message related to a registration acceptance including a second 5G-GUTI to the UE, the first 5G-GUTI includes ID information of the first AMF serving the non-3GPP access of the UE, and the second 5G-GUTI includes ID information of the second AMF serving both of the non-3GPP access and the 3GPP access of the UE.

Referring to FIG. 18, a User Equipment (UE) 100 according to the present disclosure may include a transceiver 110 and a device 120 for a wireless communication system. The device 120 for the wireless communication system may include a memory and at least one processor coupled to the memory. The transceiver 110 may be configured to transmit various signals, data and informations to an external device and receive various signals, data and informations from the external device. The UE 100 may be connected to the external device by wire and/or wireless. The at least one processor may control overall operations of the UE 100 and may be configured to perform a function of operating information to be transceived with the external device by the UE 100 and the like. The memory may store the operated information and the like for a prescribed time and may be substituted with a component such as a buffer (not shown) and the like. And, the processor may be configured to perform UE operations proposed by the present disclosure.

In some implementations, the present disclosure may include a non-transitory computer-readable medium storing computer-executable code for wireless communications. Here, the code may be configured to enable a second AMF to receive a message related to a registration request including a first 5G-GUTI from a UE receiving a service of non-3GPP access through a 5GS and a service of 3GPP access through an EPS and send a message related to a registration acceptance including a second 5G-GUTI to the UE, the first 5G-GUTI includes ID information of the first AMF serving the non-3GPP access of the UE, and the second 5G-GUTI includes ID information of the second AMF serving both of the non-3GPP access and the 3GPP access of the UE.

In the above-mentioned specific configurations of the UE 100 and the network node 200, the contents or items explained in the descriptions of the various embodiments of the present disclosure may be independently applicable or two or more embodiments of the present disclosure may be simultaneously applicable. And, redundant descriptions shall be omitted from the following description for clarity.

The embodiments of the present disclosure may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While various embodiments of the present disclosure have been described in the context of a 3GPP system, they are applicable in the same manner to various mobile communication systems.

What is claimed is:

1. A method of transceiving signals related to switching of 3rd Generation Partnership Project (3GPP) access from Evolved Packet System (EPS) to 5th Generation System (5GS) in a wireless communication system, the method comprising:
receiving, by a second Access and Mobility Management Function (AMF), a registration request message from a User Equipment (UE), the registration request message including a first 5G-Globally Unique Temporary Identifier (5G-GUTI) allocated by a first AMF; and
transmitting, by the second AMF, a message related to a registration acceptance to the UE, the message including a second 5G-GUTI,
wherein the registration request message is received by the second AMF based on the switching of the 3GPP access of the UE from the EPS to the 5GS,
wherein the first 5G-GUTI includes identification (ID) information of the first AMF serving the non-3GPP access of the UE, and
wherein the second 5G-GUTI is related to the second AMF serving both of the non-3GPP access and the 3GPP access of the UE.

2. The method of claim 1, wherein the second AMF makes a request for a transfer of context of the UE to the first AMF and receives the context of the UE from the first AMF.

3. The method of claim 1, wherein the second AMF registers with Unified Data Management (UDM) that the second AMF is a serving AMF for the non-3GPP access and the 3GPP access of the UE.

4. The method of claim 1, wherein based on that the first AMF is different from the second AMF, the first AMF is released from a serving AMF of the UE.

5. The method of claim 1, wherein the message related to the registration acceptance includes information representing that the second AMF serves the non-3GPP access of the UE.

6. An apparatus for a registration procedure related to switching of 3rd Generation Partnership Project (3GPP) access from Evolved Packet System (EPS) to 5th Generation System (5GS) in a wireless communication system, the apparatus comprising:

a memory; and at least one processor coupled to the memory, wherein the at least one processor is configured to control a second Access and Mobility Management Function (AMF) to:

receive, from a User Equipment (UE), a registration request message including a first 5G-Globally Unique Temporary Identifier (5G-GUTI) allocated by a first AMF, and transmit, to the UE, a message related to a registration acceptance, the message including a second 5G-GUTI, wherein the registration request message is received by the second AMF based on the switching of the 3GPP access of the UE from the EPS to the 5GS, wherein the first 5G-GUTI includes identification (ID) information of the first AMF serving the non-3GPP access of the UE, and wherein the second 5G-GUTI is related to the second AMF serving both of the non-3GPP access and the 3GPP access of the UE.

7. The apparatus of claim 6, wherein the second AMF makes a request for a transfer of context of the UE to the first AMF and receives the context of the UE from the first AMF.

8. The apparatus of claim 6, wherein the second AMF registers with Unified Data Management (UDM) that the second AMF is a serving AMF for the non-3GPP access and the 3GPP access of the UE.

9. The apparatus of claim 6, wherein, based on that the first AMF is different from the second AMF, the first AMF is released from a serving AMF of the UE.

10. The apparatus of claim 6, wherein the message related to the registration acceptance includes information representing that the second AMF serves the non-3GPP access of the UE.

* * * * *